(12) United States Patent
Wu et al.

(10) Patent No.: US 11,500,261 B2
(45) Date of Patent: Nov. 15, 2022

(54) ELECTROPHORETIC DISPLAY AND DRIVING METHOD THEREOF

(71) Applicant: E Ink Holdings Inc., Hsinchu (TW)

(72) Inventors: Hsin-I Wu, Hsinchu (TW);
Chien-Hung Chen, Hsinchu (TW);
Chen-Kai Chiu, Hsinchu (TW);
Chih-Yu Cheng, Hsinchu (TW)

(73) Assignee: E Ink Holdings Inc., Hsinchu (TW)

( * ) Notice: Subject to any disclaimer, the term of this patent is extended or adjusted under 35 U.S.C. 154(b) by 323 days.

(21) Appl. No.: 16/816,292

(22) Filed: Mar. 12, 2020

(65) Prior Publication Data
US 2020/0379312 A1    Dec. 3, 2020

(30) Foreign Application Priority Data

May 30, 2019 (TW) ................. 108118713

(51) Int. Cl.
*G02F 1/1685*    (2019.01)
*G02F 1/167*     (2019.01)

(52) U.S. Cl.
CPC ............ *G02F 1/1685* (2019.01); *G02F 1/167* (2013.01)

(58) Field of Classification Search
CPC ............. G09G 3/344; G09G 2310/061; G09G 2300/08; G09G 2330/021; G09G 2300/0876; G09G 2310/06; G09G 3/2011; G09G 3/2022; G09G 3/2081; G09G 2300/0434; G09G 2320/0238; G09G 2330/02; G09G 3/035; G09G 3/2096; G09G 5/006; G09G 2300/0842; G09G 2310/063; G09G 2320/066; G09G 2310/0275; G09G 2320/0204; G09G 2320/0257;
(Continued)

(56) References Cited

U.S. PATENT DOCUMENTS

| 5,933,203 A | 8/1999 | Wu et al. |
| 7,786,974 B2 | 8/2010 | Zhou et al. |

(Continued)

FOREIGN PATENT DOCUMENTS

| CN | 1791899 | 6/2006 |
| CN | 1823359 | 8/2006 |

(Continued)

OTHER PUBLICATIONS

"Office Action of China Counterpart Application", dated Apr. 14, 2021, p. 1-p. 7.

*Primary Examiner* — Brandi N Thomas
(74) *Attorney, Agent, or Firm* — JCIPRNET

(57) ABSTRACT

An electrophoretic display and a driving method thereof are provided. The electrophoretic display includes a display panel and a driving circuit. The display panel includes an electrophoretic unit and a driving substrate. The electrophoretic unit includes a plurality of electrophoretic particles. The driving substrate is disposed below the electrophoretic unit. The driving circuit is coupled to the driving substrate. The driving circuit sequentially provides a first reset signal and a second reset signal to the driving substrate during a reset period to reset the plurality of electrophoretic particles. The first reset signal sequentially includes a first sub-balanced signal and a first sub-mixed signal. The second reset signal sequentially includes a second sub-balanced signal and a second sub-mixed signal.

9 Claims, 4 Drawing Sheets

(58) Field of Classification Search
CPC ......... G09G 2310/04; G09G 2320/041; G09G 2330/026; G09G 2300/0452; G09G 2310/068; G09G 2320/0242; G09G 2320/029; G09G 2360/18; G09G 2310/0245; G09G 2310/0251; G09G 2320/0252; G09G 2300/0426; G09G 2310/027; G09G 2310/062; G09G 2310/066; G09G 3/2014; G09G 3/2018; G09G 2300/0857; G09G 2310/0259; G09G 2310/0262; G09G 2310/0281; G09G 2320/02; G09G 3/3241; G09G 3/325; G09G 3/34; G09G 3/3446; G09G 5/10; G09G 2300/043; G09G 2300/0866; G09G 2310/0205; G09G 2310/0227; G09G 2310/0248; G09G 2310/0267; G09G 2320/0223; G09G 2320/0276; G09G 2320/043; G09G 2330/08; G09G 2340/0407; G09G 2340/16; G09G 3/20; G09G 3/2007; G09G 3/30; G09G 3/3233; G09G 3/36; G09G 3/3648; G09G 3/367; G02F 1/167; G02F 1/1685; G02F 1/16755; G02F 1/1679; G02F 1/1676

See application file for complete search history.

(56) References Cited

U.S. PATENT DOCUMENTS

| | | | |
|---|---|---|---|
| 7,804,483 | B2 | 9/2010 | Zhou et al. |
| 8,274,472 | B1 | 9/2012 | Wang et al. |
| 2006/0077190 | A1 | 4/2006 | Zhou et al. |
| 2006/0132426 | A1 | 6/2006 | Johnson |
| 2010/0238093 | A1* | 9/2010 | Lu .......................... G09G 3/344 |
| | | | 345/77 |

FOREIGN PATENT DOCUMENTS

| | | |
|---|---|---|
| CN | 103137076 | 6/2013 |
| CN | 103676395 | 3/2014 |
| CN | 103996381 | 8/2014 |

* cited by examiner

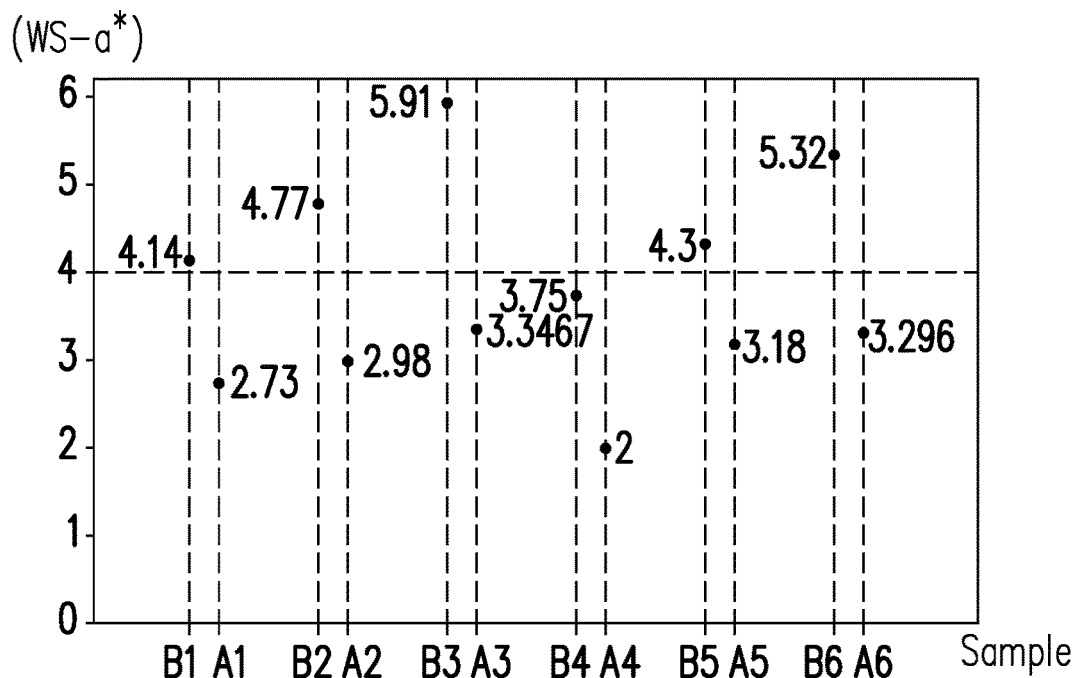

FIG. 6

| Provide a first reset signal to the driving substrate by a driving circuit during a reset period, so as to reset a plurality of electrophoretic particles in the electrophoretic unit through a first sub-balanced signal and a first sub-mixed signal sequentially included in the first reset signal | ~ S710 |
|---|---|
| Provide a second reset signal to the driving substrate by the driving circuit during the reset period, so as to reset the electrophoretic particles in the electrophoretic unit through a second sub-balanced signal and a second sub-mixed signal sequentially included in the second reset signal | ~ S720 |
| Provide a driving signal to the driving substrate by the driving circuit during a display driving period to drive at least one of the electrophoretic particles in the electrophoretic unit, such that the display panel displays a color corresponding to the driven electrophoretic particles | ~ S730 |

FIG. 7

ELECTROPHORETIC DISPLAY AND DRIVING METHOD THEREOF

CROSS-REFERENCE TO RELATED APPLICATION

This application claims the priority benefit of Taiwan application serial no. 108118713, filed on May 30, 2019. The entirety of the above-mentioned patent application is hereby incorporated by reference herein and made a part of this specification.

BACKGROUND

Technical Field

The invention relates to a display technique, and particularly relates to an electrophoretic display and a driving method thereof.

Description of Related Art

Along with advancement of electronic technology, electrophoretic displays have been widely used in various display applications and electronic devices, and current electrophoretic displays have been developed to provide an effect of color display. However, after the electrophoretic display is driven by a conventional driving method of the electrophoretic display, if the electrophoretic display rests for a period of time in a non-horizontal state, due to a bi-stability effect of electrophoretic particles, the electrophoretic particles may be in an unstable state, and a display image of the electrophoretic display may be in a dim state and mixed with other different colors. For example, a white image is biased to red. Therefore, regarding how to make the electrophoretic display to maintain a good display effect after resting for a period of time in the non-horizontal state, solutions of several embodiments are provided below.

SUMMARY

The invention is directed to an electrophoretic display and a driving method thereof, which are adapted to effectively reset a plurality of electrophoretic particles in an electrophoretic unit.

The invention provides an electrophoretic display including a display panel and a driving circuit. The display panel includes an electrophoretic unit and a driving substrate. The electrophoretic unit includes a plurality of electrophoretic particles. The driving substrate is disposed below the electrophoretic unit. The driving circuit is coupled to the driving substrate. The driving circuit is configured to sequentially provide a first reset signal and a second reset signal to the driving substrate during a reset period, so as to reset the plurality of electrophoretic particles. The first reset signal sequentially includes a first sub-balanced signal and a first sub-mixed signal. The second reset signal sequentially includes a second sub-balanced signal and a second sub-mixed signal.

The invention provides a driving method including following steps: providing a first reset signal to the driving substrate by a driving circuit during a reset period, so as to reset a plurality of electrophoretic particles in an electrophoretic unit through a first sub-balanced signal and a first sub-mixed signal sequentially included in the first reset signal; and providing a second reset signal to the driving substrate by the driving circuit during the reset period, so as to reset the electrophoretic particles in the electrophoretic unit through a second sub-balanced signal and a second sub-mixed signal sequentially included in the second reset signal.

According to the above description, the electrophoretic display and the driving method thereof may effectively reset a distribution position of the plurality of electrophoretic particles in the electrophoretic unit by means of two-stage resetting of the plurality of electrophoretic particles in the electrophoresis unit, such that the reset electrophoretic display may still provide good display quality after resting for a period of time in the non-horizontal state.

To make the aforementioned more comprehensible, several embodiments accompanied with drawings are described in detail as follows.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

FIG. 6 is an effect diagram of displaying a white image by a display panel according to an embodiment of the invention.

FIG. 7 is a flowchart illustrating a driving method according to an embodiment of the invention.

DESCRIPTION OF THE EMBODIMENTS

Figure 1:
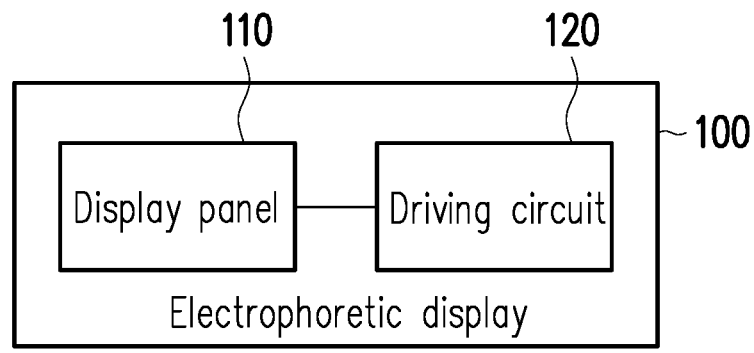
FIG. 1 is a block diagram of an electrophoretic display according to an embodiment of the invention.

Reference will now be made in detail to the present preferred embodiments of the invention, examples of which are illustrated in the accompanying drawings. Wherever possible, the same reference numbers are used in the drawings and the description to refer to the same or like parts.

FIG. 1 is a block diagram of an electrophoretic display according to an embodiment of the invention. Referring to FIG. 1, the electrophoretic display 100 includes a display panel 110 and a driving circuit 120. In the embodiment, the electrophoretic display 100 is a color electrophoretic display device, and has a display effect of displaying at least three colors. The display panel 110 includes a plurality of pixels, and theses pixels respectively correspond to a plurality of electrophoretic units arranged in an array, where the electrophoretic units include electrophoretic particles of three colors. In the embodiment, the driving circuit 120 is configured to provide a first reset signal, a second reset signal and a driving signal to the display panel 110, so as to drive the plurality of electrophoretic particles in the electrophoretic units.

In the embodiment, the driving circuit 120 drives the electrophoretic particles to move in the electrophoretic units by applying a voltage, so that each pixel of the display panel 110 may respectively display a black color, a white color, a grayscale or a specific color. The display panel 110 is, for example, a microcapsule electrophoretic panel or a microcup electrophoretic panel. In the embodiment, the electrophoretic units of the display panel 110 are, for example, microcup structures, and the electrophoretic units may respectively include a plurality of white electrophoretic particles, a plurality of color electrophoretic particles and a plurality of black electrophoretic particles. It should be noted that, in various embodiments of the invention, the color electrophoretic particles are, for example, red electrophoretic particles or yellow electrophoretic particles, but the invention is not limited thereto.

Figure 2:
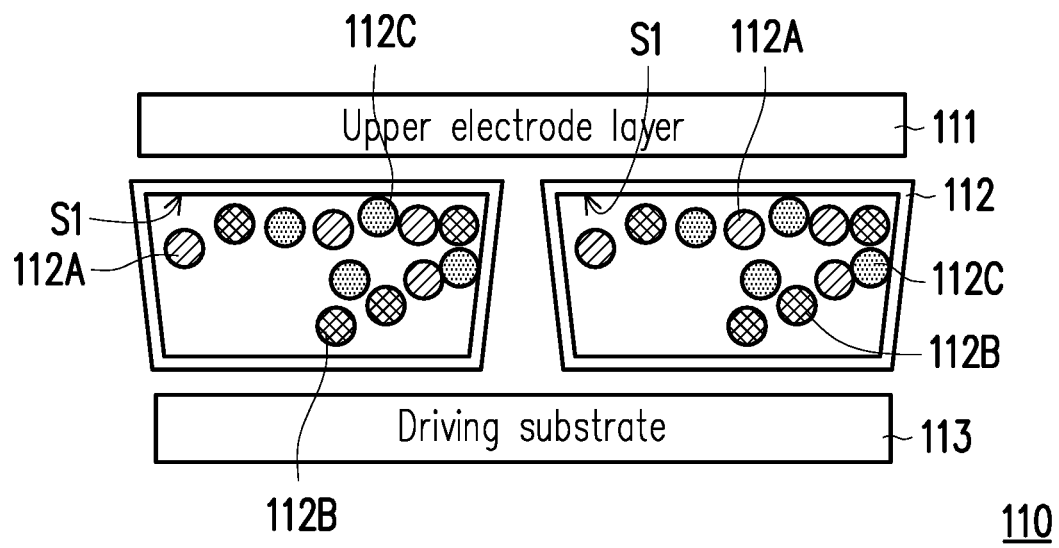
FIG. 2 is a schematic diagram of a display panel according to an embodiment of the invention.

FIG. 2 is a schematic diagram of a display panel according to an embodiment of the invention. Referring to FIG. 1 and FIG. 2, FIG. 2 is a schematic diagram of a plurality of electrophoretic units of the display panel 110. In the embodiment, a single pixel of the display panel 110 includes an upper electrode layer 111, a plurality of electrophoretic units 112 and a driving substrate 113. The electrophoretic units 112 are disposed between the upper electrode layer 111 and the driving substrate 113, and a display side S1 of the electrophoretic unit 112 is close to the upper electrode layer 111. In the embodiment, the upper electrode layer 111 is, for example, a transparent electrode layer. The electrophoretic units 112 respectively include a plurality of white electrophoretic particles 112A, a plurality of color electrophoretic particles 112B and a plurality of black electrophoretic particles 112C. The number of the electrophoretic units 112 and the number of the electrophoretic particles in the electrophoretic units 112 are not limited to that shown in FIG. 2. In the embodiment, the driving substrate 113, for example, includes a driving transistor, and the driving transistor is configured to receive a driving signal to drive the white electrophoretic particles 112A, the color electrophoretic particles 112B and the black electrophoretic particles 112C of the electrophoretic units 112 to move in the electrophoretic units 112.

In the embodiment, the white electrophoretic particles 112A are, for example, electrophoretic particles carrying negative charges. The color electrophoretic particles 112B are, for example, red electrophoretic particles or yellow electrophoretic particles carrying positive charges. The black electrophoretic particles 112C are, for example, electrophoretic particles carrying positive charges. However, the invention does not limit the type of charges carried by the white electrophoretic particles 112A, the color electrophoretic particles 112B and the black electrophoretic particles 112C.

In the embodiment, if the electrophoretic units 112 would be displayed white, black or a specific color (red or yellow), the driving circuit 120 first sequentially provides the first reset signal and the second reset signal to the driving substrate 113 during a reset period to reset the white electrophoretic particles 112A, the color electrophoretic particles 112B and the black electrophoretic particles 112C in the electrophoretic units 112. Then, the driving circuit 120 provides a driving signal to the driving substrate 113 during a display driving period, so as to drive at least one of the white electrophoretic particles 112A, the color electrophoretic particles 112B and the black electrophoretic particles 112C in the electrophoretic units 112 to make the display panel 110 to display a color corresponding the driven electrophoretic particles.

In the embodiment, the first reset signal may sequentially include a first sub-balanced signal and a first sub-mixed signal, and the second reset signal may sequentially include a second sub-balanced signal and a second sub-mixed signal. In other words, the driving circuit 120 of the embodiment alternately drives at least one of the white electrophoretic particles 112A, the color electrophoretic particles 112B and the black electrophoretic particles 112C in the electrophoretic units 112 through two different sub-balanced signals and two different sub-mixed signals, such that the at least one of the white electrophoretic particles 112A, the color electrophoretic particles 112B and the black electrophoretic particles 112C may be effectively reset and distributed in the electrophoretic units 112 in a manner of average distribution or specific distribution. Therefore, the electrophoretic display 100 of the embodiment may still maintain a good display effect after resting for a period of time in a non-horizontal state.

A plurality of signal waveforms used for driving the white electrophoretic particles 112A, the color electrophoretic particles 112B and the black electrophoretic particles 112C are described below with reference of FIG. 3 to FIG. 5.

Figure 3:
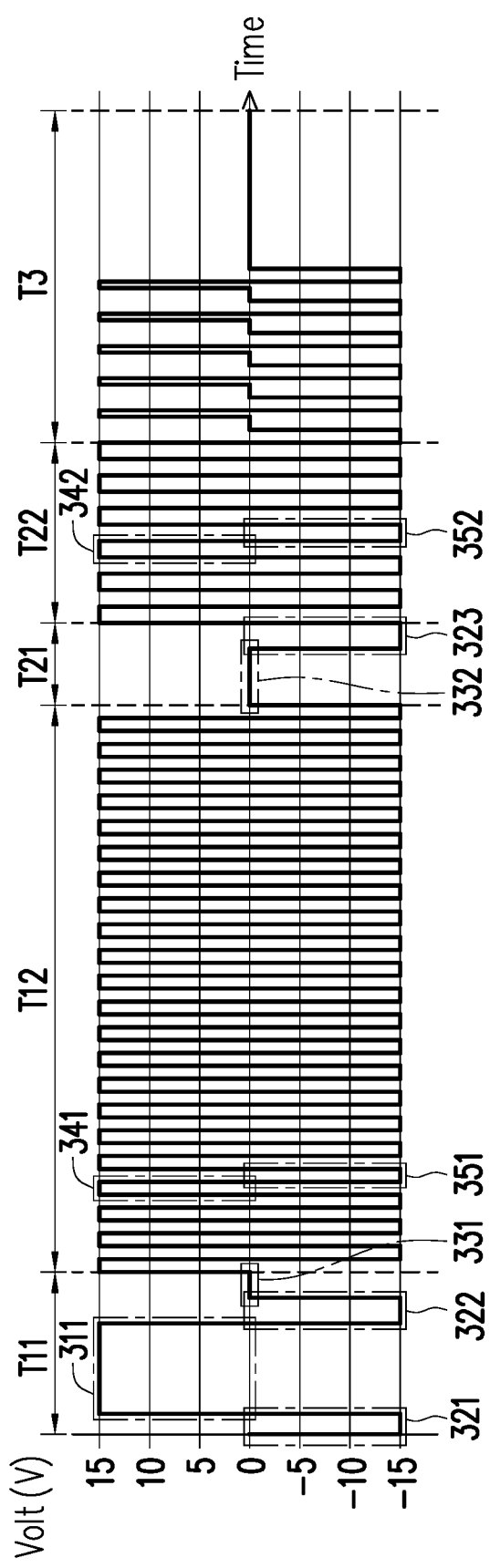
FIG. 3 is a diagram of a signal waveform for driving white electrophoretic particles according to an embodiment of the invention.

FIG. 3 is a diagram of a signal waveform for driving white electrophoretic particles according to an embodiment of the invention. Referring to FIG. 1 to FIG. 3, regarding the white electrophoretic particles, the driving circuit 120 may provide the first reset signal with the signal waveform shown in FIG. 3 (a signal waveform corresponding to a balanced-period T11 and a mixed-period T12) and the second reset signal with the signal waveform shown in FIG. 3 (a signal waveform corresponding to a balanced-period T21 and a mixed-period T22) to the driving substrate 113, so as to reset the white electrophoretic particles 112A in the electrophoretic units 112. Moreover, in the embodiment, the driving circuit 120 may provide a driving signal with the signal waveform shown in FIG. 3 (a signal waveform corresponding to a display driving period T3) to the driving substrate 113, so as to drive the white electrophoretic particles 112A in the electrophoretic units 112.

In the embodiment, the first reset signal sequentially includes the first sub-balanced signal (a signal waveform corresponding to the balanced period T11) and the first sub-mixed signal (a signal waveform corresponding to the mixed period T12). The first sub-balanced signal includes a negative voltage pulse 321, a positive voltage pulse 311, a negative voltage pulse 322 and a ground voltage pulse 331 arranged in sequence. For example, a voltage amplitude of the negative voltage pulse 321 is −15 volts, and a pulse width thereof (a time length) is 200 ms. A voltage amplitude of the positive voltage pulse 311 is +15 volts, and a pulse width thereof is 1240 ms. A voltage amplitude of the negative voltage pulse 322 is −15 volts, and a pulse width thereof is 280 ms. A voltage amplitude of the ground voltage pulse 331 is 0 volt, and a pulse width thereof is 300 ms. The first sub-mixed signal includes a plurality of positive voltage pulses 341 and a plurality of negative voltage pulses 351 arranged in interleaving. For example, a voltage amplitude of the positive voltage pulse 341 is +15 volts, and a pulse width thereof is 70 ms. A voltage amplitude of the negative voltage pulse 351 is −15 volts, and a pulse width thereof is 70 ms. Moreover, the number of the positive voltage pulses 341 and the number of the negative voltage pulses 351 are, for example, respectively 40.

In the embodiment, the second reset signal sequentially includes the second sub-balanced signal (a signal waveform corresponding to the balanced period T21) and the second sub-mixed signal (a signal waveform corresponding to the mixed period T22). The second sub-balanced signal includes a ground voltage pulse 332 and a negative voltage pulse 323 arranged in sequence. For example, a voltage amplitude of the ground voltage pulse 332 is 0 volt, and a pulse width thereof is 520 ms. A voltage amplitude of the negative voltage pulse 323 is −15 volts, and a pulse width thereof is 100 ms. The second sub-mixed signal includes a plurality of positive voltage pulses 342 and a plurality of negative voltage pulses 352 arranged in interleaving. For example, a voltage amplitude of the positive voltage pulse 342 is +15 volts, and a pulse width thereof is 100 ms. A voltage amplitude of the negative voltage pulse 352 is −15 volts, and a pulse width thereof is 100 ms. Moreover, the number of the positive voltage pulses 342 and the number of the negative voltage pulses 352 are, for example, respectively 10.

However, the invention is not limited to the voltage amplitudes and the pulse widths of each of the aforementioned voltage pulses and the number of the voltage pulses, and the voltage amplitudes and the pulse widths of each of the aforementioned voltage pulses and the number of the voltage pulses may be correspondingly designed according to different usage requirements or different types of the electrophoretic particles. In the embodiment, a time length of the first sub-balanced signal is larger than a time length of the second sub-balanced signal, and a time length of the first sub-mixed signal is larger than a time length of the second sub-mixed signal. Moreover, in the embodiment, a pulse type of the driving signal may refer to the display driving period T3 of FIG. 3, but the invention is not limited thereto. The pulse type of the driving signal may be determined according to different display driving requirements.

In the embodiment, a total pulse width of all of the positive voltage pulses of the first reset signal, the second reset signal and the driving signal is substantially equal to a total pulse width of all of the negative voltage pulses of the first reset signal, the second reset signal and the driving signal. In other words, after the white electrophoretic particles 112A in the electrophoretic units 112 are driven by the first reset signal, the second reset signal and the driving signal provided to the driving substrate 113 by the driving circuit 120, the white electrophoretic particles 112A are in a charge neutralization state. Moreover, the display panel 110 displays a white image corresponding to the driven white electrophoretic particles 112A, and in an exemplary embodiment, a color tint value (tint) of the white image displayed by the display panel 110 is smaller than 4. Therefore, the electrophoretic display of the embodiment may effectively reset the white electrophoretic particles 112A in the electrophoretic units 112, so that the electrophoretic display 100 may still maintain a good display effect of the white color after resting for a period of time in the non-horizontal state.

Figure 4:
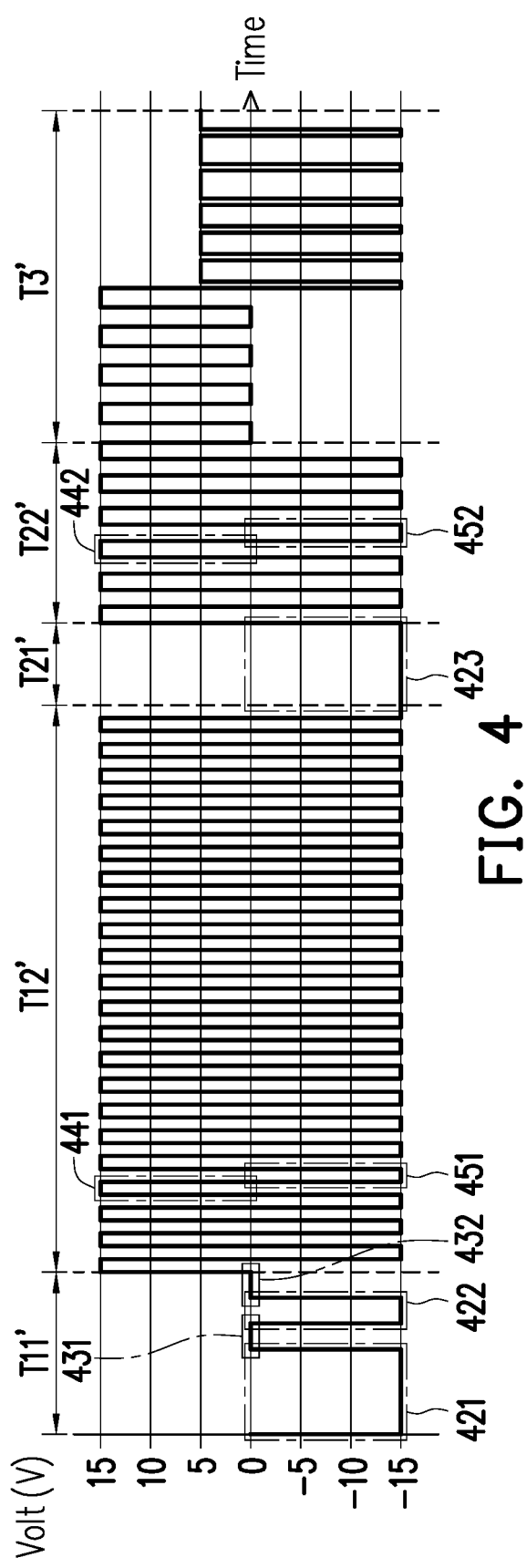
FIG. 4 is a diagram of a signal waveform for driving color electrophoretic particles according to an embodiment of the invention.

FIG. 4 is a diagram of a signal waveform for driving color electrophoretic particles according to an embodiment of the invention. Referring to FIG. 1, FIG. 2 and FIG. 4, regarding the color electrophoretic particles, the driving circuit 120 may provide the first reset signal with the signal waveform shown in FIG. 4 (a signal waveform corresponding to a balanced-period T11' and a mixed-period T12') and the second reset signal with the signal waveform shown in FIG. 4 (a signal waveform corresponding to a balanced-period T21' and a mixed-period T22') to the driving substrate 113, so as to reset the color electrophoretic particles 112B in the electrophoretic units 112. Moreover, in the embodiment, the driving circuit 120 may provide a driving signal with the signal waveform shown in FIG. 4 (a signal waveform corresponding to a display driving period T3') to the driving substrate 113, so as to drive the color electrophoretic particles 112B in the electrophoretic units 112.

In the embodiment, the first reset signal sequentially includes the first sub-balanced signal (a signal waveform corresponding to the balanced period T11') and the first sub-mixed signal (a signal waveform corresponding to the mixed period T12'). The first sub-balanced signal includes a negative voltage pulse 421, a ground voltage pulse 431, a negative voltage pulse 422 and a ground voltage pulse 432 arranged in sequence. For example, a voltage amplitude of the negative voltage pulse 421 is −15 volts, and a pulse width thereof is 1040 ms. A voltage amplitude of the ground voltage pulse 431 is 0 volt, and a pulse width thereof is 400 ms. A voltage amplitude of the negative voltage pulse 422 is −15 volts, and a pulse width thereof is 380 ms. A voltage amplitude of the ground voltage pulse 432 is 0 volt, and a pulse width thereof is 200 ms. The first sub-mixed signal includes a plurality of positive voltage pulses 441 and a plurality of negative voltage pulses 451 arranged in interleaving. For example, a voltage amplitude of the positive voltage pulse 441 is +15 volts, and a pulse width thereof is 70 ms. A voltage amplitude of the negative voltage pulse 451 is −15 volts, and a pulse width thereof is 70 ms. Moreover, the number of the positive voltage pulses 441 and the number of the negative voltage pulses 451 are, for example, respectively 40.

In the embodiment, the second reset signal sequentially includes the second sub-balanced signal (a signal waveform corresponding to the balanced period T21') and the second sub-mixed signal (a signal waveform corresponding to the mixed period T22'). The second sub-balanced signal includes a negative voltage pulse 423. For example, a voltage amplitude of the negative voltage pulse 423 is −15 volts, and a pulse width thereof is 620 ms. The second sub-mixed signal includes a plurality of positive voltage pulses 442 and a plurality of negative voltage pulses 452 arranged in interleaving. For example, a voltage amplitude of the positive voltage pulse 442 is +15 volts, and a pulse width thereof is 100 ms. A voltage amplitude of the negative voltage pulse 452 is −15 volts, and a pulse width thereof is 100 ms. Moreover, the number of the positive voltage pulses 442 and the number of the negative voltage pulses 452 are, for example, respectively 10.

However, the invention is not limited to the voltage amplitudes and the pulse widths of each of the aforementioned voltage pulses and the number of the voltage pulses, and the voltage amplitudes and the pulse widths of each of the aforementioned voltage pulses and the number of the voltage pulses may be correspondingly designed according to different usage requirements or different types of the electrophoretic particles. In the embodiment, a time length of the first sub-balanced signal is larger than a time length of the second sub-balanced signal, and a time length of the first sub-mixed signal is larger than a time length of the second sub-mixed signal. Moreover, in the embodiment, a pulse type of the driving signal may refer to the display driving period T3' of FIG. 4, but the invention is not limited thereto. The pulse type of the driving signal may be determined according to different display driving requirements.

In the embodiment, a total pulse width of all of the positive voltage pulses of the first reset signal, the second reset signal and the driving signal is substantially equal to a total pulse width of all of the negative voltage pulses of the first reset signal, the second reset signal and the driving signal. In other words, after the color electrophoretic particles 112B in the electrophoretic units 112 are driven by the first reset signal, the second reset signal and the driving signal provided to the driving substrate 113 by the driving circuit 120, the color electrophoretic particles 112B are in a charge neutralization state. Moreover, the display panel 110 displays a color image corresponding to the driven color electrophoretic particles 112B. Therefore, the electrophoretic display of the embodiment may effectively reset the color electrophoretic particles 112B in the electrophoretic units 112, and provide a better color display effect, so that the electrophoretic display 100 may still maintain a good display effect of a specific color (red or yellow) after resting for a period of time in the non-horizontal state.

Figure 5:
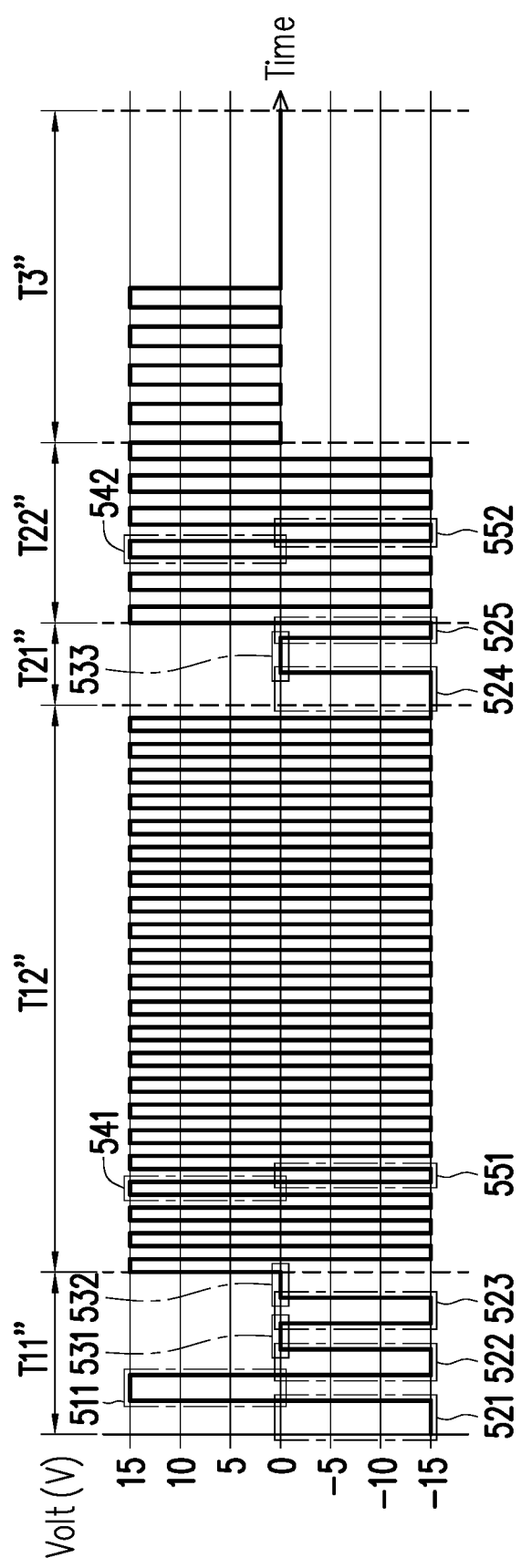
FIG. 5 is a diagram of a signal waveform for driving black electrophoretic particles according to an embodiment of the invention.

FIG. 5 is a diagram of a signal waveform for driving black electrophoretic particles according to an embodiment of the invention. Referring to FIG. 1, FIG. 2 and FIG. 5, regarding the black electrophoretic particles, the driving circuit 120 may provide the first reset signal with the signal waveform shown in FIG. 5 (a signal waveform corresponding to a balanced-period T11" and a mixed-period T12") and the second reset signal with the signal waveform shown in FIG. 5 (a signal waveform corresponding to a balanced-period T21" and a mixed-period T22") to the driving substrate 113, so as to reset the black electrophoretic particles 112C in the electrophoretic units 112. Moreover, the driving circuit 120 may provide a driving signal with the signal waveform shown in FIG. 5 (a signal waveform corresponding to a display driving period T3") to the driving substrate 113, so as to drive the black electrophoretic particles 112C in the electrophoretic units 112.

In the embodiment, the first reset signal sequentially includes the first sub-balanced signal (a signal waveform corresponding to the balanced period T11") and the first sub-mixed signal (a signal waveform corresponding to the mixed period T12"). The first sub-balanced signal includes a negative voltage pulse 521, a positive voltage pulse 511, a negative voltage pulse 522, a ground voltage pulse 531, a negative voltage pulse 523 and a ground voltage pulse 532 arranged in sequence. For example, a voltage amplitude of the negative voltage pulse 521 is −315 volts, and a pulse width thereof is 200 ms. A voltage amplitude of the positive voltage pulse 511 is +15 volts, and a pulse width thereof is 430 ms. A voltage amplitude of the negative voltage pulse 522 is −15 volts, and a pulse width thereof is 410 ms. A voltage amplitude of the ground voltage pulse 531 is 0 volt, and a pulse width thereof is 400 ms. A voltage amplitude of the negative voltage pulse 523 is −15 volts, and a pulse width thereof is 280 ms. A voltage amplitude of the ground voltage pulse 532 is 0 volt, and a pulse width thereof is 300 ms. The first sub-mixed signal includes a plurality of positive voltage pulses 541 and a plurality of negative voltage pulses 551 arranged in interleaving. For example, a voltage amplitude of the positive voltage pulse 541 is +15 volts, and a pulse width thereof is 70 ms. A voltage amplitude of the negative voltage pulse 551 is −15 volts, and a pulse width thereof is 70 ms. Moreover, the number of the positive voltage pulses 541 and the number of the negative voltage pulses 551 are, for example, respectively 40.

In the embodiment, the second reset signal includes the second sub-balanced signal (a signal waveform corresponding to the balanced period T21") and the second sub-mixed signal (a signal waveform corresponding to the mixed period T22"). The second sub-balanced signal includes a negative voltage pulse 524, a ground voltage pulse 533 and a negative voltage pulse 525 arranged in sequence. For example, a voltage amplitude of the negative voltage pulse 524 is −15 volts, and a pulse width thereof is 280 ms. A voltage amplitude of the ground voltage pulse 533 is 0 volt, and a pulse width thereof is 240 ms. A voltage amplitude of the negative voltage pulse 525 is −15 volts, and a pulse width thereof is 100 ms. The second sub-mixed signal includes a plurality of positive voltage pulses 542 and a plurality of negative voltage pulses 552 arranged in interleaving. For example, a voltage amplitude of the positive voltage pulse 542 is +15 volts, and a pulse width thereof is 100 ms. A voltage amplitude of the negative voltage pulse 552 is −15 volts, and a pulse width thereof is 100 ms. Moreover, the number of the positive voltage pulses 542 and the number of the negative voltage pulses 552 are, for example, respectively 10.

However, the invention is not limited to the voltage amplitudes and the pulse widths of each of the aforementioned voltage pulses and the number of the voltage pulses, and the voltage amplitudes and the pulse widths of each of the aforementioned voltage pulses and the number of the voltage pulses may be correspondingly designed according to different usage requirements or different types of the electrophoretic particles. In the embodiment, a time length of the first sub-balanced signal is larger than a time length of the second sub-balanced signal, and a time length of the first sub-mixed signal is larger than a time length of the second sub-mixed signal. Moreover, in the embodiment, a pulse type of the driving signal may refer to the display driving period T3" of FIG. 5, but the invention is not limited thereto. The pulse type of the driving signal may be determined according to different display driving requirements.

In the embodiment, a total pulse width of all of the positive voltage pulses of the first reset signal, the second reset signal and the driving signal is substantially equal to a total pulse width of all of the negative voltage pulses of the first reset signal, the second reset signal and the driving signal. In other words, after the black electrophoretic particles 112C in the electrophoretic units 112 are driven by the first reset signal, the second reset signal and the driving signal provided to the driving substrate 113 by the driving circuit 120, the black electrophoretic particles 112C are in a charge neutralization state. Moreover, the display panel 110 displays a color image corresponding to the driven black electrophoretic particles 112C. Therefore, the electrophoretic display 100 of the embodiment may effectively reset the color electrophoretic particles 112C in the electrophoretic units 112, and provide a better color display effect, so that the electrophoretic display 100 may still maintain a good display effect of the black color after resting for a period of time in the non-horizontal state.

Referring to FIG. 1 to FIG. 5, furthermore, when the electrophoretic units 112 are actually driven to display white, black or a specific color (for example, red or yellow) on the display sides S1, the driving circuit 120 provides all of the reset signals shown in FIG. 3 to FIG. 5 (voltage signals combining various pulse waveforms of various reset signals of FIG. 3 to FIG. 5) to the driving substrate 113 during a reset phase, so as to reset the white electrophoretic particles 112A, the color electrophoretic particles 112B and the black electrophoretic particles 112C in the electrophoretic units 112. It should be noted that, the voltage signals of FIG. 3 to FIG. 5 do not correspond to each other in time, but the first sub-balanced signal, the first sub-mixed signal, the second sub-balanced signal and the second sub-mixed signal of FIG. 3 to FIG. 5 are sequentially provided to the driving substrate 113, so that the white electrophoretic particles 112A, the color electrophoretic particles 112B and the black electrophoretic particles 112C may be uniformly distributed in the electrophoretic units 112.

Then, the driving circuit provides the driving signal of at least one of the FIG. 3 to the FIG. 5 to the driving substrate 113 in a display driving phase, so as to reset at least one of the white electrophoretic particles 112A, the color electrophoretic particles 112B and the black electrophoretic particles 112C in the electrophoretic units 112, such that at least one of the white electrophoretic particles 112A, the color electrophoretic particles 112B and the black electrophoretic particles 112C may be stacked on the display sides S1 of the electrophoretic units 112. Therefore, the electrophoretic display 100 of the embodiment may provide good display effect. Particularly, regarding the white electrophoretic particles 112A, the reset electrophoretic display 100 may still maintain a good white color display effect after resting for a period of time in the non-horizontal state, i.e. the white portion is mixed with less other colors, and a situation that the white color is biased to red or yellow is avoided.

FIG. 6 is an effect diagram of displaying a white image by the display panel after resetting and resting for 24 hours in the non-horizontal state according to an embodiment of the invention. Referring to FIG. 6, FIG. 6 shows experimental data of color tint values of the white display image obtained by using the first reset signal, the second reset signal and the driving signal of the embodiment of FIG. 3 to drive the white electrophoretic particles in the electrophoretic units. It should be noted that, the higher the color tint value (WS−a*) is, the higher the degree of inclusion of other colors is, and the lower the color tint value is, the lower the degree of inclusion of other colors is. Moreover, when the display image displays the white color, and rests for a period of time, if the color tint value thereof is lower than 4, the display image still maintains a better white color display effect.

In FIG. 6, the color tint values of a plurality of electrophoretic display samples B1-B6 adopting the conventional driving method are mostly higher, and the color tint values of a plurality of electrophoretic display samples A1-A6 adopting the driving method of the invention are mostly lower. It should be noted that, the color tint values of the electrophoretic display samples A1-A6 are all lower than that of the electrophoretic display samples B1-B6, and the color tint values of the electrophoretic display samples A1-A6 are all lower than 4. Namely, after the electrophoretic display of the embodiment is subjected to the resetting and display driving of the embodiment of FIG. 3, and rests for a period of time, the display panel of the electrophoretic display of the embodiment may provide good white color display effect.

FIG. 7 is a flowchart illustrating a driving method according to an embodiment of the invention. Referring to FIG. 1, FIG. 2 and FIG. 7, the driving method of FIG. 7 may be at least adapted to the electrophoretic display 100 of the embodiments of FIG. 1 and FIG. 2. In step S710, the driving circuit 120 provides a first reset signal to the driving substrate 113 during a reset period, so as to reset a plurality of electrophoretic particles 112A-112C in the electrophoretic units 112 through a first sub-balanced signal and a first sub-mixed signal sequentially included in the first reset signal. In step S720, the driving circuit 120 provides a second reset signal to the driving substrate 113 during the reset period, so as to reset the electrophoretic particles 112A-112C in the electrophoretic units 112 through a second sub-balanced signal and a second sub-mixed signal sequentially included in the second reset signal. In the embodiment, a time length of the first sub-balanced signal is larger than a time length of the second sub-balanced signal, and a time length of the first sub-mixed signal is larger than a time length of the second sub-mixed signal. In step S730, the driving circuit 120 provides a driving signal to the driving substrate 113 during a display driving period to drive at least one of the electrophoretic particles 112A-112C in the electrophoretic units 112, such that the display panel displays a color corresponding to the driven electrophoretic particles. Therefore, the electrophoretic display 100 of the embodiment may still maintain the good display effect even after resting for a period of time in the non-horizontal state.

Moreover, enough instructions and recommendations for other device features, implementation details and technical features of the electrophoretic display 100 of the embodiment may be learned from related descriptions of the embodiments of FIG. 1 to FIG. 6, and details thereof are not repeated.

In summary, the electrophoretic display and the driving method thereof may effectively reset a distribution position of the plurality of electrophoretic particles in the electrophoretic units by means of two-stage balanced and mixed interleaving driving, such that the reset electrophoretic units may still maintain good display quality of the white color, the black color or a specific color after display driving and resting for a period of time in the non-horizontal state. Therefore, the electrophoretic display of the invention may provide a good user experience effect.

It will be apparent to those skilled in the art that various modifications and variations can be made to the disclosed embodiments without departing from the scope or spirit of the invention. In view of the foregoing, it is intended that the invention covers modifications and variations provided they fall within the scope of the following claims and their equivalents.

What is claimed is:

1. An electrophoretic display, comprising:
a display panel, comprising:
an electrophoretic unit, comprising a plurality of electrophoretic particles;
a driving substrate, disposed below the electrophoretic unit; and
a driving circuit, coupled to the driving substrate, and configured to sequentially provide a first reset signal and a second reset signal to the driving substrate during a reset period, so as to reset the electrophoretic particles,
wherein the first reset signal sequentially comprises a first sub-balanced signal and a first sub-mixed signal, and the second reset signal sequentially comprises a second sub-balanced signal and a second sub-mixed signal,
wherein the electrophoretic particles comprise a plurality of white electrophoretic particles, and the first sub-balanced signal comprises a first negative voltage pulse, a first positive voltage pulse, a second negative voltage pulse, and a first ground voltage pulse arranged in sequence, and the second sub-balanced signal comprises a second ground voltage pulse and a third negative voltage pulse arranged in sequence.

2. The electrophoretic display as claimed in claim 1, wherein a time length of the first sub-balanced signal is larger than a time length of the second sub-balanced signal.

3. The electrophoretic display as claimed in claim 1, wherein a total pulse width of all of positive voltage pulses of the first reset signal, the second reset signal and a driving signal is equal to a total pulse width of all of negative voltage pulses of the first reset signal, the second reset signal and the driving signal.

4. The electrophoretic display as claimed in claim 1, wherein the electrophoretic particles comprise a plurality of color electrophoretic particles, and the first sub-balanced signal comprises a fourth negative voltage pulse, a third ground voltage pulse, a fifth negative voltage pulse, and a fourth ground voltage pulse arranged in sequence, and the second sub-balanced signal comprises a sixth negative voltage pulse.

5. The electrophoretic display as claimed in claim 1, wherein the electrophoretic particles comprise a plurality of black electrophoretic particles, and the first sub-balanced signal comprises a seventh negative voltage pulse, a second positive voltage pulse, an eighth negative voltage pulse, a fifth ground voltage pulse, a ninth negative voltage pulse and a sixth ground voltage pulse arranged in sequence, and the second sub-balanced signal comprises a tenth negative voltage pulse, a seventh ground voltage pulse and an eleventh negative voltage pulse arranged in sequence.

6. The electrophoretic display as claimed in claim 1, wherein the first sub-mixed signal comprises another plurality of positive voltage pulses and another plurality of negative voltage pulses arranged in interleaving, and the second sub-mixed signal comprises yet another plurality of positive voltage pulses and yet another plurality of negative voltage pulses arranged in interleaving,
wherein a pulse width of each of the another plurality of positive voltage pulses and the another plurality of negative voltage pulses is larger than a pulse width of each of the yet another plurality of positive voltage pulses and the yet another plurality of negative voltage pulses.

7. The electrophoretic display as claimed in claim 6, wherein a pulse number of the first positive voltage pulses and the first negative voltage pulses is greater than a pulse number of the second positive voltage pulses and the second negative voltage pulses.

8. The electrophoretic display as claimed in claim 1, wherein the driving circuit is further configured to provide a driving signal to the driving substrate during a display driving period, so as to drive the electrophoretic particles in the electrophoretic unit, such that the display panel displays a color corresponding to the driven electrophoretic particles.

9. A driving method of an electrophoretic display, wherein the electrophoretic display comprises a display panel and a driving circuit, and the display panel comprises an electrophoretic unit and a driving substrate, the driving method comprising:
providing a first reset signal to the driving substrate by a driving circuit during a reset period, so as to reset a plurality of electrophoretic particles in the electrophoretic unit through a first sub-balanced signal and a first sub-mixed signal sequentially included in the first reset signal; and
providing a second reset signal to the driving substrate by the driving circuit during the reset period, so as to reset the electrophoretic particles in the electrophoretic unit through a second sub-balanced signal and a second sub-mixed signal sequentially included in the second reset signal,
wherein the electrophoretic particles comprise a plurality of white electrophoretic particles, and the first sub-balanced signal comprises a first negative voltage pulse, a first positive voltage pulse, a second negative voltage pulse, and a first ground voltage pulse arranged in sequence, and the second sub-balanced signal comprises a second ground voltage pulse and a third negative voltage pulse arranged in sequence.

* * * * *